United States Patent [19]

Kato et al.

[11] Patent Number: 5,336,029
[45] Date of Patent: Aug. 9, 1994

[54] LOADING APPARATUS HAVING A SUCTION-HOLD MECHANISM

[75] Inventors: Naoki Kato, Yamato; Eiji Konoshima, Zama; Kyoji Kinokiri, Tokyo; Jiro Ikeda, Fujieda, all of Japan

[73] Assignee: Kabushiki Kaisha Shibaura Seisakusho Sony Corp, Japan

[21] Appl. No.: 757,982

[22] Filed: Sep. 12, 1991

[30] Foreign Application Priority Data

Nov. 30, 1990 [JP] Japan .................. 2-336690

[51] Int. Cl.$^5$ .................................. B65G 47/91
[52] U.S. Cl. .................. 414/217; 414/737; 414/736; 414/225; 414/627; 414/719; 118/719; 901/40; 267/136
[58] Field of Search .......... 414/627, 729, 736, 737, 414/217, 742, 728, 222, 225, 226, 359, 620, 618, DIG. 5, DIG. 7, 619, 719, 367, 359; 118/719, 500; 204/298.25; 294/64.1, 65; 901/40; 267/139, 136, 137, 140

[56] References Cited

U.S. PATENT DOCUMENTS

| | | | |
|---|---|---|---|
| 1,447,428 | 3/1923 | Ramsay | 414/359 |
| 3,071,258 | 1/1963 | Seigh et al. | 414/766 |
| 4,135,619 | 1/1979 | Cerboni | 414/737 X |
| 4,542,712 | 9/1985 | Sato et al. | 414/217 X |
| 4,604,026 | 8/1986 | Barrett | 414/737 X |
| 4,752,180 | 6/1988 | Yoshikawa | 414/737 |
| 4,846,625 | 7/1989 | Gabillet | 414/736 X |
| 5,135,635 | 8/1992 | Ikeda | 414/217 |

FOREIGN PATENT DOCUMENTS

| | | |
|---|---|---|
| 0061502 | 10/1982 | European Pat. Off. . |
| 0062071 | 10/1982 | European Pat. Off. . |
| 2491381 | 4/1982 | France . |

OTHER PUBLICATIONS

Singulus Brochure (Leybold AG)-pp. 1-6.
Balzers Brochure-pp. 1-15.

*Primary Examiner*—Frank E. Werner
*Attorney, Agent, or Firm*—Wigman, Cohen, Leitner & Myers

[57] ABSTRACT

A suction head having plural suction pads on both surfaces thereof is used to transfer a substrate of a compack disk and the like from one position to another for loading. The suction head is connected to a rotating shaft rotatable and movable in a vertical direction. The rotating shaft causes the suction head to turn over and move in an up-and-down direction. The suction pads on both surfaces of the suction head are connected to a pair of flexible pipes which are wound around the shaft and connected respectively to exhaust systems. Thus, the suction pads capture and release the substrate by suction control so as to load the same at a prescribed position. Further, a shock absorber is provided to relieve a shock upon the stoppage of the suction head in vertical and rotational reciprocating motions.

18 Claims, 8 Drawing Sheets

LOADING APPARATUS HAVING A SUCTION-HOLD MECHANISM

FIELD OF THE INVENTION

This invention relates to a loading apparatus having a suction-hold mechanism, suitable for the transfer-in and-out of an object in a continuous sputtering system, for example.

BACKGROUND OF THE INVENTION

A compact disk (hereinafter, referred to as a CD) has been widely used to record a large amount of digitized sound and image information. The substrate of the CD is made of transparent synthetic resin on the surface of which a large number of so-called pits are formed in accordance with digital information of "1" or "0". An aluminum thin film layer having high light reflectivity is deposited on the thus formed surface by use of a sputtering technique. The thus recorded information is read by the presence or absence of the reflected light of a laser light beam applied to the CD.

The aluminum thin film deposition of a single substrate can be performed in a relatively short period. Thus, a continuous film deposition with respect to a large number of substrates can be achieved.

As shown in FIG. 9, in a conventional substrate loading apparatus 95, a disk substrate 81 is transferred and loaded in a film-deposition chamber 80, which is a vacuum chamber, by use of a suction head 87. The suction head 87 serves both to transfer the substrate 81 and to hermetically seal the film-deposition chamber 80. A plurality of suction pads 87a which hold substrate 81 by sucking are provided on the suction head 87. The suction head 87 is fixed to a rotating shaft 86 which is rotatable in a direction indicated by arrow X3, and is movable vertically in a direction indicated by arrow Y3. These rotational and vertical motions of the shaft 86 can be achieved by use of a drive mechanism 82 including a motor 83 and a gear arrangement 84, and an air cylinder 85. The suction pads 87a are connected to an external exhaust system 91 by way of an exhaust-and-intake passage 88 formed piercing through the suction head 87 and rotating shaft 86, an outlet 89, and a pipe 90.

The external exhaust system 91 serves as an operation source which causes the suction pads 87a to capture and release substrate 81. The system 91 comprises a bifurcated pipe 92, valves 93a and 93b, and an exhaust pump 94 such as a vacuum pump.

Assume that the above-described substrate loading apparatus 95 receives substrate 81 from a plurality of suction pads 96 of a conveyor-type transferring apparatus (not shown), and loads the thus received substrate 81 in the film-deposition chamber 80 shown in FIG. 10. In this case, the valve 93a is opened so as to cause the suction pads 87a to capture substrate 81. The rotating shaft 86 is driven by the motor 83 to rotate by about 180 degrees. As a result, the thus captured substrate 81 is caused to face the film-deposition chamber 80.

Next, suction head 87 is moved down toward film-deposition chamber 80 by use of the air cylinder 85. Thereafter, valve 93a is closed, and valve 93b is opened to introduce the atmosphere. As a result, substrate 81 is transferred in film-deposition chamber 80.

In the above-described conventional substrate loading operations, the repetitive vertical and 180 degree rotational motions of rotating shaft 86 and suction head 87 are performed whereas the external exhaust system 91 is fixed to the ground. Thus, pipe 90, whose one end is fixed to the external exhaust system 91 and the other end is fixed to the rotating shaft 86, inevitably experiences the torsional reciprocating motions associated with vertical motions.

To alleviate the stress-strain of pipe 90 in the above-described operation, the length of pipe 90 must be increased. However, the lengthy pipe 90 has disadvantages such that a large space is required for pipe 90 to achieve the torsional swiveling motions. Further, these motions of pipe 90 are dangerous for the operator.

Moreover, the inertia moment of the heavy suction head 87, which moves repeatedly in turn-over reciprocating motions, applies undesirable load to the motor 83 and gear arrangement 84. Such inertia moment can cause the overload of motor 83 and the wear of gears.

Further, in the conventional substrate loading apparatus, suction head 87 carries only a single sheet of substrate 81 at a time. Thus, the loading cycle speed of the apparatus can be increased only by the increase of the rotation speed of the drive mechanism 82. This inevitably limits the increase of the loading cycle speed. Therefore, the improvement of the loading apparatus has been desired.

FIG. 10 shows the conventional film-deposition chamber 80 which comprises an upper wall plate 98, a load-lock section 99, and a sputtering section 100. Further, a load-lock chamber 101 is formed in the upper wall plate 98 at a position over the load-lock section 99.

The load-lock chamber 101, which is shown in an enlarged cross-sectional view of FIG. 11, serves as a boundary chamber between the atmospheric pressure and a vacuum when substrate 81 to be sputtered is delivered to a susceptor 102 from suction head 87 or when sputtered substrate 81 is delivered to suction head 87 from susceptor 102. A passage 103, which serves both to exhaust and intake, is formed in the upper wall plate 98. The passage 103 is connected to an external rotary pump 105 through a bifurcated pipe 104, a valve 106a and a pipe 109.

When substrate 81 is delivered to susceptor 102 from suction head 87, valve 81 is opened to coarsely exhaust load-lock chamber 101 to a vacuum of an intermediate degree, which is against the sucking force of suction pads 87a. Thus, substrate 81 can be delivered to susceptor 102 from suction head 87. Thereafter, a transferring table 107, to which susceptor 102 is fixed, is moved downward. Further, film-deposition chamber 80 and load-lock chamber 101 are still exhausted to a vacuum of a higher degree by use of an exhaust vent 108.

Further, when, after finishing sputtering process by facing a mask 116 of sputtering chamber 115, the film deposited substrate 81 is delivered to suction head 87 from susceptor 102, the other valve 106b, which is interposed between the bifurcated pipe 104 and the atmosphere through a pipe 110, as shown in FIG. 12, is temporarily opened to introduce the atmospheric pressure into load-lock chamber 101. Thereafter, substrate 81 is captured by suction pads 87a, and is transferred to the outside. In FIG. 11, reference characters L represent o-rings for sealing.

In the above-described conventional substrate loading apparatus, substrate 81 is held by suction pads 87a and a ring-shaped rim 111 formed in the periphery of suction head 87, as shown in FIG. 11. This is because suction head 87 must hold substrate 81 without touching its surface on which information has been recorded.

However, the conventional substrate loading apparatus has the following disadvantages. Specifically, when sputtered substrate 81 is delivered to suction head 87 from susceptor 102, the pressure in load-lock chamber 101 is changed to the atmospheric pressure. On the other hand, substrate 81 has been captured by suction pads 87a and in close contact with rim 111. This forms a hermetically sealed space 112 interposing substrate 81 for a certain period, and the pressure in the space 112 differs from the atmospheric pressure in this period. Thus, substrate 81 might be deformed by bending into a shape illustrated by the dotted line 113. As a result, the information-recorded surface of substrate 81 might be directly touched to suction head 87 and damaged. Such damage to the information-recorded surface of substrate 81 can also occur even when substrate 81 is delivered to susceptor 102 from suction head 87. This is because susceptor 102 receives substrate 81 in a plane-contact manner. Even a minute scar on the information-recorded surface of substrate 81 causes substrate 81 per se to be a defect. Thus, the improvement, in which such undesirable damage that can occur in the process of transferring is avoided, has been desired.

Moreover, in the conventional substrate loading apparatus, suction head 87, to which pipe 90 for exhaust and intake is connected (see FIG. 9), is moved in turnover reciprocating motions. Thus, a large space is required for the movement of pipe 90, and a heavy load is repeatedly applied to suction head drive mechanism 82. Further, substrate loading is performed in a sheet-by-sheet manner. Thus, the speed increase of substrate loading is inevitably limited. If an attempt is made to increase the speed of substrate loading, the load applied to suction head drive mechanism 82 is still increased.

Furthermore, in the conventional substrate loading apparatus, the information-recorded surface of substrate 81 might be damaged while being received and delivered in load-lock chamber 101 because of deformation caused by the pressure difference between both sides of substrate 81.

SUMMARY OF THE INVENTION

Accordingly, one object of the present invention is to provide a loading apparatus that can avoid the above-described disadvantages. Specifically, the apparatus can lighten the load applied to the suction head drive mechanism, and can be structured in a compact configuration. Further, the apparatus can significantly increase the substrate loading speed, and can transfer substrates assuredly and safely.

Briefly, in accordance with one aspect of the present invention, there is provided a loading apparatus having a suction-hold mechanism, comprising a suction head having a plurality of suction pads for holding an object to be transferred, a rotation mechanism for rotating the suction head, a pipe connected to the suction pads, and a fixed exhaust system connected to the pipe, the loading apparatus transferring the object from a first position to a second position along a direction crossing the rotating shaft of the rotation mechanism, the improvement of the apparatus comprising:

a suction head having two surfaces, each surface having a plurality of suction pads provided thereon, for suck-holding the object a pair of flexible pipes, each having one end connected to the suction pads and the other ends connected to fixed exhaust pumps, the flexible pipes being wound around the circumference of the rotating shaft;

means for turning over the suction head at the first position;

means for selectively operating the suction pads so as to suck the object; and means for reciprocating the suction head between the first and second positions so as to transfer the object therebetween.

The object to be transferred is preferable to be disk- or sheet-shaped. However, any complicated cubic objects may be applicable as long as they can be appropriately sucked.

In accordance with one aspect of the present invention, the loading apparatus is applied to a continuous sputtering system in which an aluminum film is deposited on each of CD substrates by use of a sputtering technique.

Specifically, in the substrate loading apparatus according to the above-described aspect of the present invention, the flexible pipes are wound around the rotating shaft, and then connected to the external exhaust-and-intake systems. Thus, the entire apparatus can be structured in a compact configuration. Further, a shock absorber is provided to absorb the shock upon the turn of the suction head, and to lighten the load applied to the drive mechanism. Moreover, a plurality of suction pads are provided on both surfaces of the suction head. Thus, the substrate loading apparatus can transfer substrates with a high efficiency.

In the apparatus of this invention, the peripheral portions of both the suction head and the susceptor are formed so as to be lower than their respective center portions. Thus, when the substrate is present in the load-lock chamber for reception or delivery, some clearance can be obtained between the substrate and the peripheral portions of both the suction head and the susceptor. Therefore, the pressure difference between both sides of the substrate can be effectively avoided. As a result, the substrate can be prevented from deformation by bending.

Further, the substrate is supported by a plurality of convex portions provided in the periphery of the susceptor. Assume that the imaginary lines, which are connected between any two of the convex portions opposing to each other, pass through the center of the substrate. In this case, the substrate is easily caused to rotate about the center line which supports the substrate. Thus, the substrate might be placed on the susceptor in an inclined state. To avoid this, the number of the convex portions are determined to be odd numbers whereby the imaginary lines connected between any two of the convex portions do not pass through the center of the substrate. As a result, the substrate can be transferred safely and assuredly without inclining.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
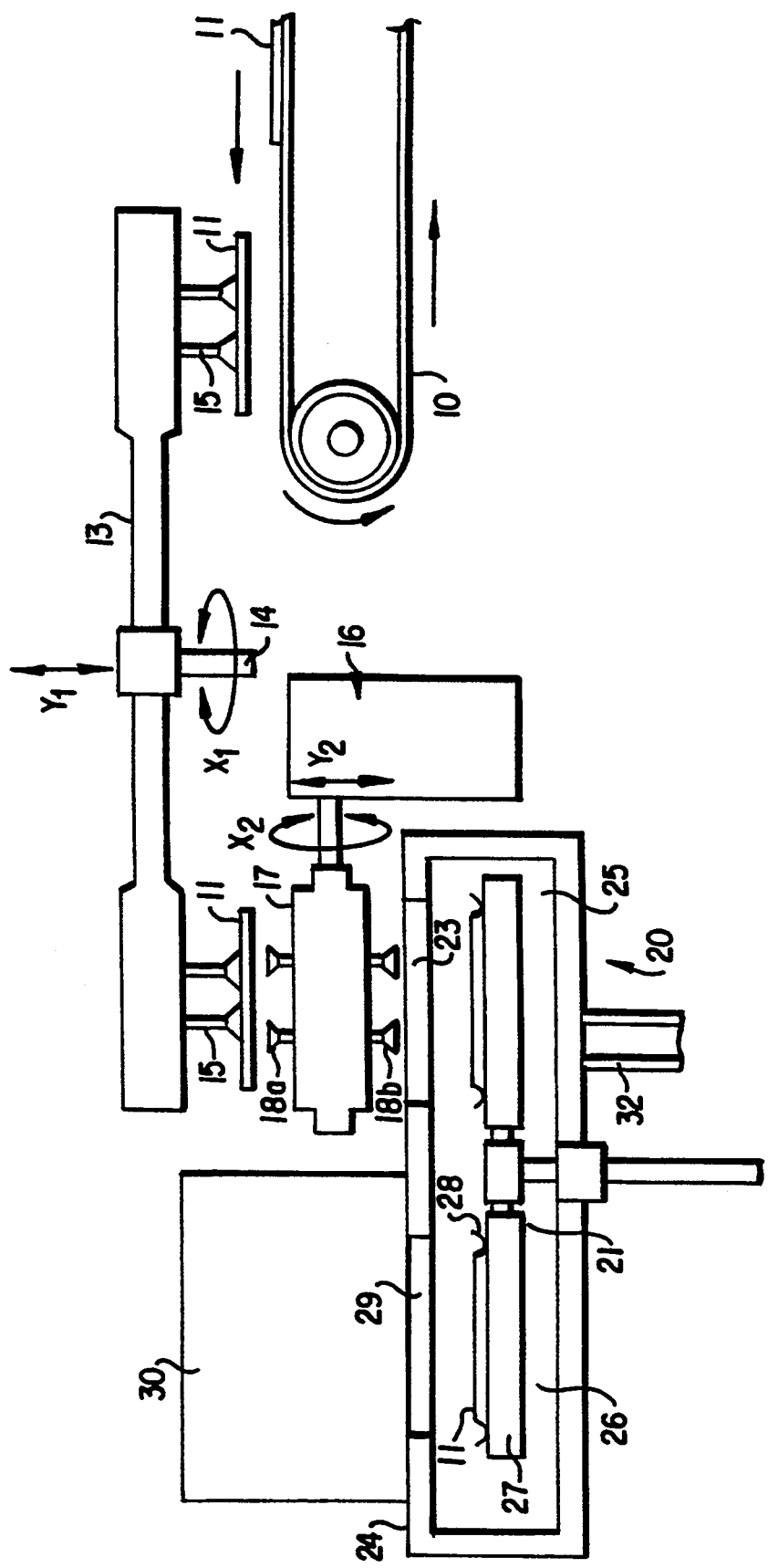
FIG. 1 is a partially cutaway side view illustrating a substrate loading apparatus according to one embodiment of the present invention when applied to a continuous sputtering system.

Referring now to the drawings, wherein like reference numerals designate identical or corresponding parts throughout the several view, the present invention will be described with reference to embodiments applied to a film-deposition system for CD substrates by use of a continuous sputtering technique.

Figure 2:
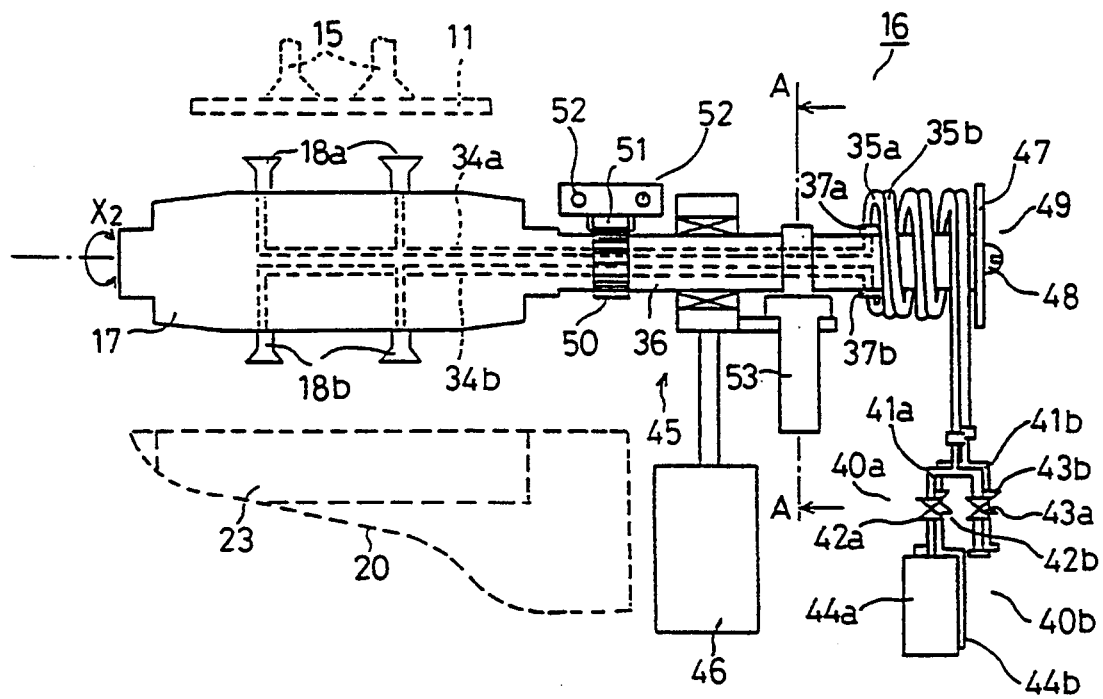
FIG. 2 is a side view illustrating an essential portion of the embodiment shown in FIG. 1.
Figure 3:
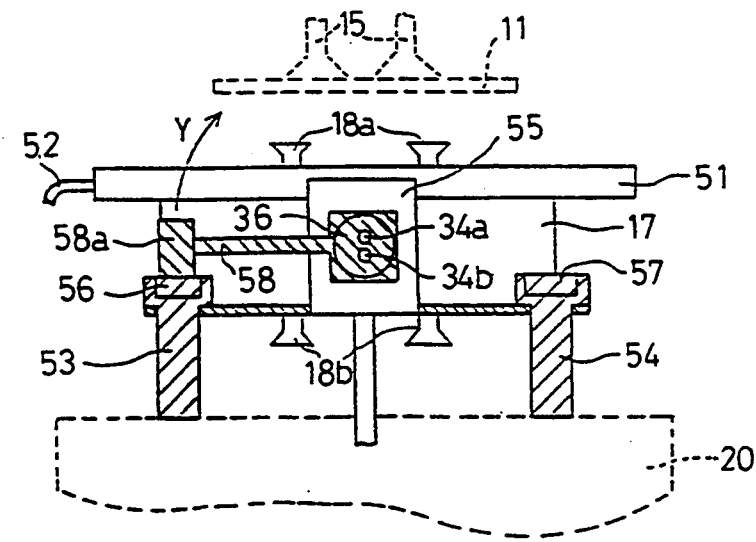
FIG. 3 is a cross-sectional view taken along line A—A of the apparatus shown in FIG. 2.

FIG. 1 through FIG. 3 are schematic configuration diagram illustrating a first embodiment of a substrate loading apparatus according to the present invention.

In FIG. 1, a large number of substrates 11 of CD and the like are sequentially transferred by an external transferring apparatus 10, e.g., a belt-conveyor and the like. The thus transferred substrates 11 are captured in a sheet-by sheet manner by suction pads 15 of a substrate transferring apparatus 13, which is rotatable about a shaft 14 (in a direction indicated by arrow X1) and is movable vertically in a direction indicated by arrow Y1. The thus captured substrate 11 is transferred to a substrate loading apparatus 16.

The substrate loading apparatus 16 receives substrate 11 and load it into an internal transferring apparatus 21 provided in a film-deposition chamber 20 through a load-lock chamber 23. The loading of substrate 11 is performed by use of suction pads 18a and 18b provided on both surfaces of a suction head 17.

Further, the film-deposition chamber 20 comprises an upper wall plate 24, a load-lock section 25 and a sputtering section 26, as shown in FIG. 1. The load-lock chamber 23 is formed in the upper wall plate 24 at a position over the load-lock section 25.

In the film-deposition chamber 20 which is a vacuum chamber, substrate 11 is placed on a susceptor 28 of a transferring table 27, and transferred to the sputtering section 26 from the load-lock section 25. The transferring of substrate 11 is performed by the rotation of transferring table 27.

An opening 29 is provided in the upper wall plate 24 at a position over the sputtering section 26, and a sputtering source chamber 30 is disposed at a position over the opening 29. Further, a mask 31 which receives substrate 11 is attached to opening 29. An aluminum film is deposited on the upper surface of substrate 11 which is being in close contact with the lower surface of mask 31. The film-deposition is performed in a short period of about 2 seconds. The sputtering source chamber 30 is exhausted through an exhaust vent 32 of film-deposition chamber 20 while substrate 11 is not being in close contact with mask 31.

The load-lock chamber 23 formed in upper wall plate 24 serves as a boundary chamber between the atmosphere and a vacuum when substrate 11 is delivered to susceptor 28 from suction head 17 and when sputtered substrate 11 is delivered to suction head 17 from susceptor 28.

As shown in FIG. 2, the loading apparatus 16 comprises a plurality of suction pads 18a and 18b provided on both surfaces of the disc-shaped suction head 17, a pair of passages 34a and 34b connected respectively to suction pads 18a and 18b, a pair of pipes 35a and 35b, and a pair of external exhaust systems 40a and 40b fixedly installed outside.

The pipes 35a and 35b are made of synthetic resin having different colors for ease of discrimination, and are flexible, hermetic and translucent. Each of pipes 35a and 35b has one end connected respectively to outlets 37a and 37b provided in the radial direction of rotating shaft 36. Further, pipes 35a and 35b are wound relatively loosely by plural turns around the circumference of rotating shaft 36. The other ends of pipes 35a and 35b are respectively connected to the external exhaust systems 40a and 40b.

The capture and release of substrate 11 in the loading apparatus 16 are performed by the open-and-close operations of valves 42a, 42b, 43a and 43b of bifurcated pipes 41a and 41b and the operations of vacuum pumps 44a and 44b in the external exhaust systems 40a and 40b. These operations are performed cooperatively with the operations of suction-head drive mechanism 45, substrate transferring apparatus 13 shown in FIG. 1, and internal transferring apparatus 21 in film-deposition chamber 20. The entire cooperative operations are controlled in accordance with control signals produced from a control apparatus (not shown).

In this invention, a plurality of suction pads 18a and 18b are provided on both surfaces of suction head 17 on a common shaft element 36 so as to constitute two substrate transferring systems. Thus, both the substrate loading into film-deposition chamber 20 and the delivery of substrate 11 from film-deposition chamber 20 to the substrate transferring apparatus 13 (see FIG. 1) can be performed in a single up-and-down operation of air-cylinder 46. As a result, the operation efficiency of substrate loading can be significantly enhanced, whereby, the operation speed thereof can be increased.

Further, pipes 35a and 35b are wound around the circumference of rotating shaft 36 in a coil-shaped fashion, and then connected to the external exhaust systems 40a and 40b. Thus, even when pipes 35a and 35b receive the rotational reciprocating motions (arrow X2) of rotating shaft 36, the thus received momentum thereof can be absorbed in a circumferential direction of the coil of pipes 35a and 35b. As a result, shearing forces applied to pipes 35a and 35b per se become smaller. In other words, the rotational reciprocating motions applied to pipes 35a and 35b are received in the circumferential direction of the coil. Thus, such motions are changed into smaller expansion and contraction in the radial directions of pipes 35a and 35b. Further, even when the up-and-down motions (arrow Y2) produced by air-cylinder 46 are added, the mechanical load applied to the drive mechanism 45 can be suppressed. Moreover, a stopper mechanism 49, which comprises a disc-shaped stopper 47 provided at the end of rotating shaft 36 and a screw 48, serves to prevent the wound pipes 35a and 35b from falling off, and to incorporate the same in a compact space.

In this embodiment, suction-head drive mechanism 45 is structured in the following manner. Specifically, a rack 51 is engaged with a pinion 50 fixed to rotating shaft 36. The rack 51 is slidably reciprocated by high-pressure air supplied alternately through pipes 52. Thus, the linear reciprocating motions of rack 51 can be changed into the rotational reciprocating motions of rotating shaft 36 in a range of about 180 degrees.

Further, a pair of shock absorbers 53 and 54 are provided to absorb the shock upon the turn of rotating shaft 36, which is caused by the inertia moment of suction head 17. This alleviates the load applied to pinion 50 and rack 51.

More specifically, as shown in FIG. 3, shock absorbers 53 and 54 are fixed to the movable block of air-cylinder 55. Further, shock absorbers 53 and 54, in which rubber materials 56 and 57 are respectively filled, are situated on both sides of rotating shaft 36. An arm 58 is fixed to rotating shaft 36, and a top head portion 58a of arm 58 hits shock absorbers 53 and 54 each time suction head 17 travels in a direction indicated by arrow Y and turns. As a result, each shock upon the turn of suction head 17 can be absorbed by either one of shock absorbers 53 or 54.

Naturally, rubber materials 56 and 57 of shock absorbers 53 and 54 can be replaced with other elastic means, e.g., coil-springs incorporated in concave portions filled with oil.

As described above, in the substrate loading apparatus according to the present invention, pipes 35a and 35b are wound around rotating shaft 36, and then connected to external exhaust systems 40a and 40b. Thus, the compactness of substrate loading apparatus can be achieved. Further, shock absorbers 53 and 54 absorb the moment of inertia upon the turn of suction head 17, and alleviate the shock thereof. As a result, both the reliability-enhancement and the speed-increase in terms of the substrate-transferring can be achieved simultaneously.

Next, a second embodiment of a substrate loading apparatus according to the present invention will be described with reference to cross-sectional views of FIGS. 4 and 5, and a plan view of FIG. 6.

Figure 4:
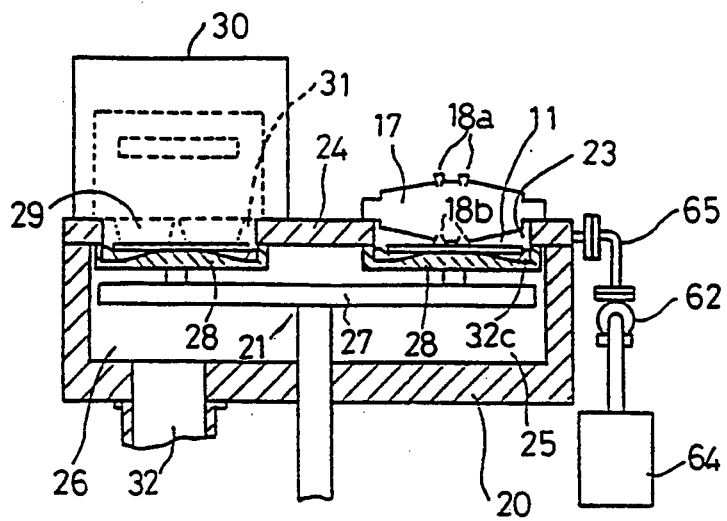
FIG. 4 is a cross-sectional view illustrating a second embodiment of the substrate loading apparatus according to the present invention.

In FIG. 4, a load-lock chamber 23 is formed in an upper wall plate 24 of a film-deposition chamber 20. Further, as shown in an enlarged cross-sectional view of FIG. 5, an exhaust-and-intake passage 60 having one end exposed to load-lock chamber 23 is laterally formed in upper wall plate 24. A suction head 17 for transferring substrate 11 is disc-shaped, and has two surfaces on which plural suction pads 18a and 18b are provided to capture substrates 11. The peripheral portions of the respective surfaces of suction head 17 are lower than the center portions thereof such that bevelled portions 61 are formed in a taper fashion.

Assume that, as shown in FIG. 4, substrate 11, which has been captured and transferred by suction pads 18b, is delivered to a susceptor 28 of a transferring table 27 through load-lock chamber 23. In this case, a valve 62 is opened, and load-lock chamber 23 is exhausted by use of an exhaust pump 64 to be a vacuum. Thus, substrate 11 is released from suction pads 18b, and then placed on susceptor 28. The surface of susceptor 28, on which substrate 11 is placed, has a peripheral portion formed lower than the center portion thereof. Further, a plurality of convex portions 63 (see FIG. 5 and FIG. 6) are provided in the peripheral portion of susceptor 28 so as to support substrate 11 without touching its surface on which information has been recorded.

Figure 6:
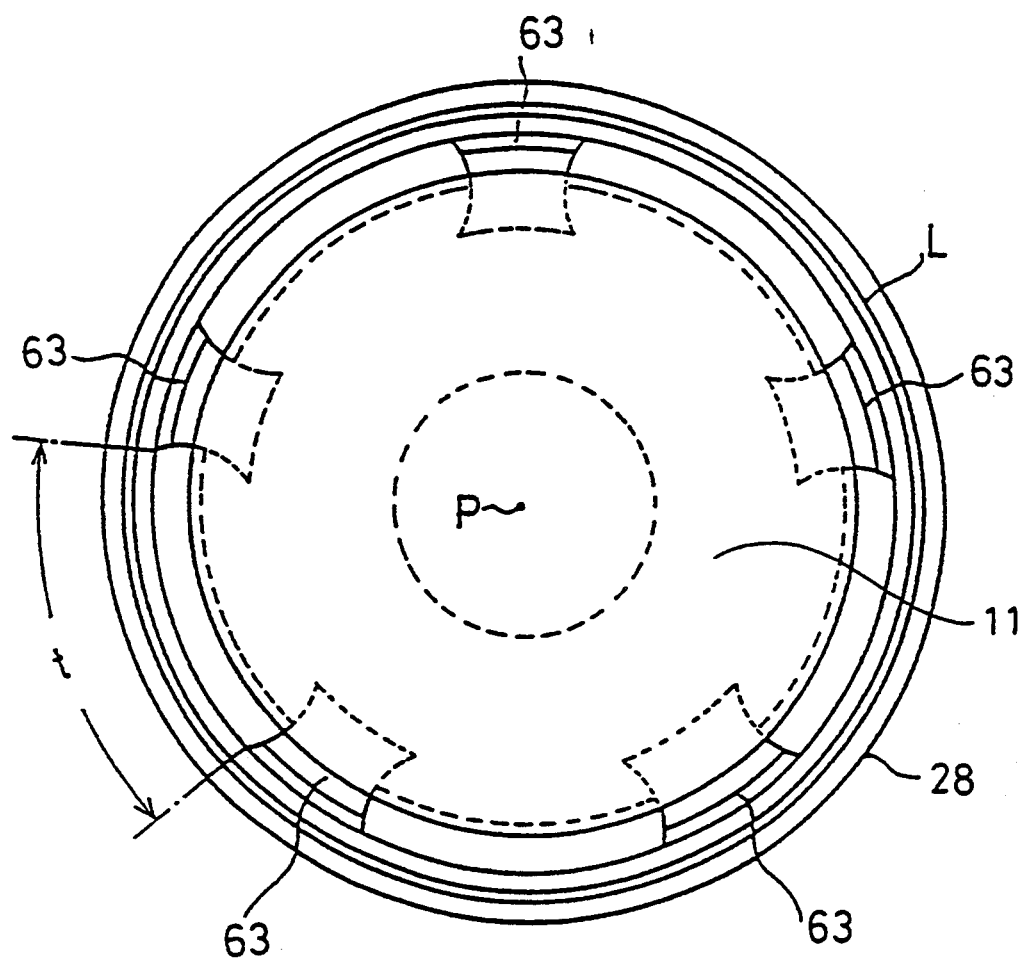
FIG. 6 is a plan view taken along line B—B of the susceptor shown in FIG. 5.

In this embodiment, susceptor 28 has an odd number (e.g., five) of convex portions 63 separated at equal distances t, as shown in FIG. 6. All the imaginary straight lines connected between any two convex portions 63 do not pass through the center P of substrate 11. Thus, a two-point support on the line passing through the center P (i.e., both extreme ends on the diameter) can be avoided. As a result, the undesirable rotation or shift of substrate 11 can be effectively prevented. Further, the distances t between adjacent convex portions 63 are sufficiently large so that the atmosphere can be smoothly introduced into the space between susceptor 28 and substrate 11. Thus, the pressure difference between both sides of substrate 11 never can occur.

After the prescribed film-deposition process, substrate 11 is transferred to suction head 17 from susceptor 28. In this case, valve 62 is closed, and another valve (not shown) is opened so as the introduce the atmosphere into load-lock chamber 23. The peripheral portions of both surfaces of suction head 17 are formed lower than the center portions thereof. Thus, the peripheral portion of suction head 17 is separated from substrate 11. As a result, the atmosphere can be easily introduced into the space between substrate 11 and suction had 17. This can avoid the pressure difference between both sides of substrate 11.

Therefore, even when the pressure in load-lock chamber 23 is abruptly changed to the atmospheric pressure, substrate 11 is free from being deformed by bending, unlike in the case of the conventional loading apparatus. Further, the surface of substrate 11, on which information has been recorded, does not touch suction head 17, so that the surface is free from damage.

Figure 5:
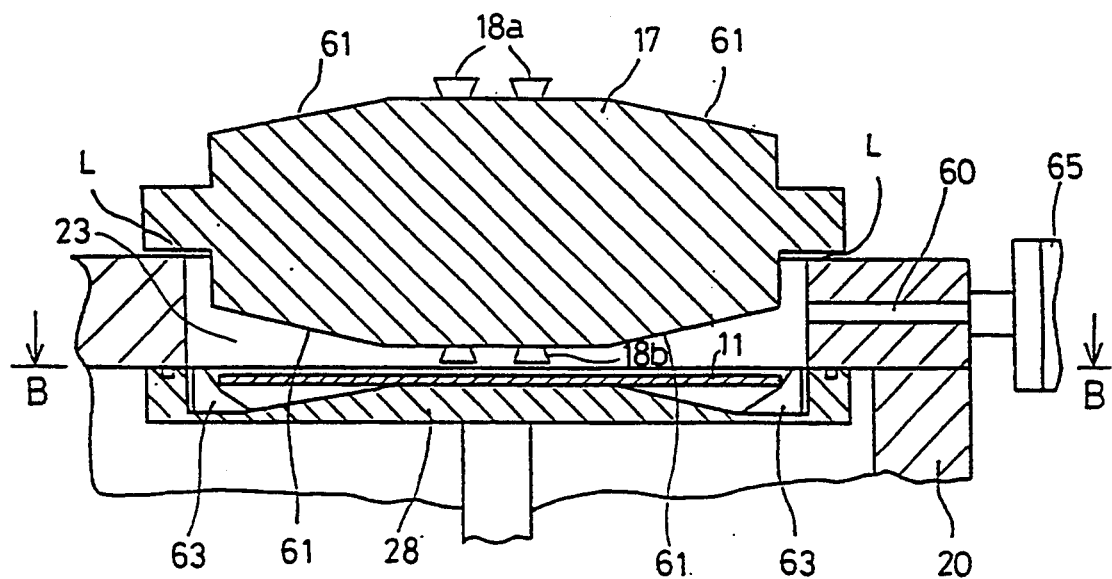
FIG. 5 is an enlarged diagram illustrating an essential portion of the apparatus shown in FIG. 4.

Moreover, suction head 17 has a bevelled portion 61, as shown in FIG. 5. Thus, it is more difficult for substrate 11 to touch the peripheral portion of suction head 17 even when substrate 11 is inclined to some extent because of its oscillatory motion which might occur in the delivery and reception processes. As a result, the prescribed substrate-transferring can be performed while such non-touch state is being assuredly maintained.

Further, according to the present invention, an exhaust-and-intake passage 60 communicated to load-lock chamber 23 may also be formed in a more shortened configuration without a bifurcated pipe 65 installed outside.

Figure 7:
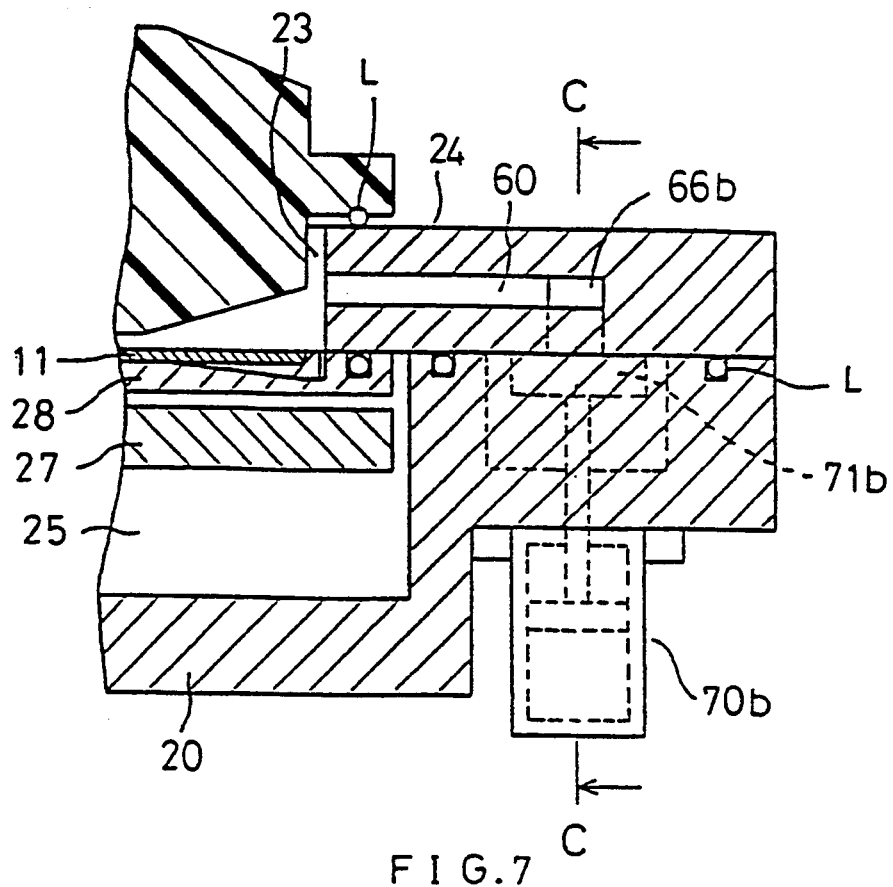
FIG. 7 is a cross-sectional view illustrating an essential portion of a third embodiment of the substrate loading apparatus according to the present invention.
Figure 8:
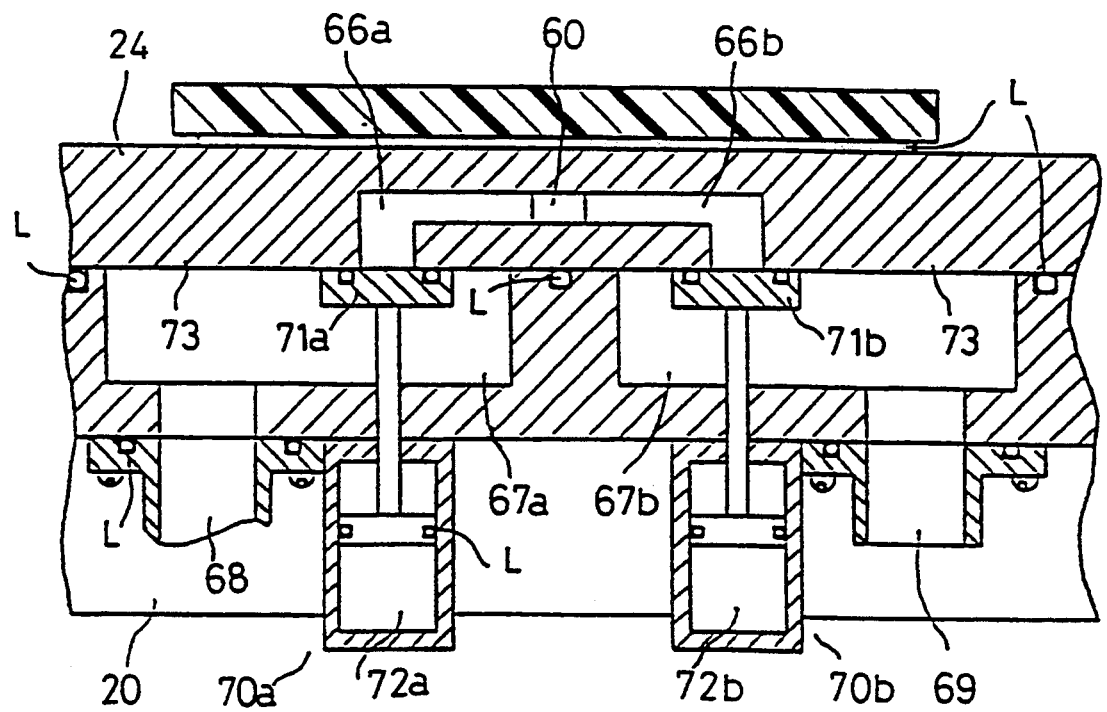
FIG. 8 is a cross-sectional view taken along line C—C of the apparatus shown in FIG. 7.
Figure 9:
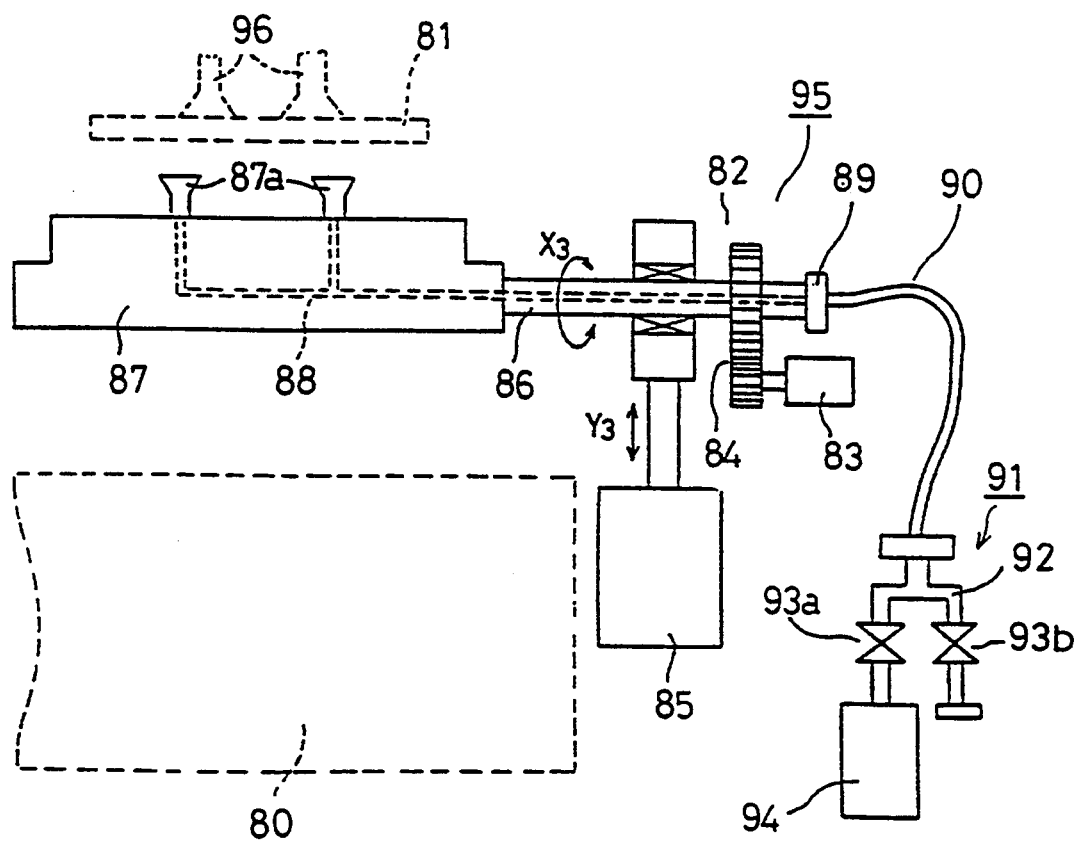
FIG. 9 is an enlarged cross-sectional view illustrating an essential portion of the conventional loading apparatus.
Figure 10:
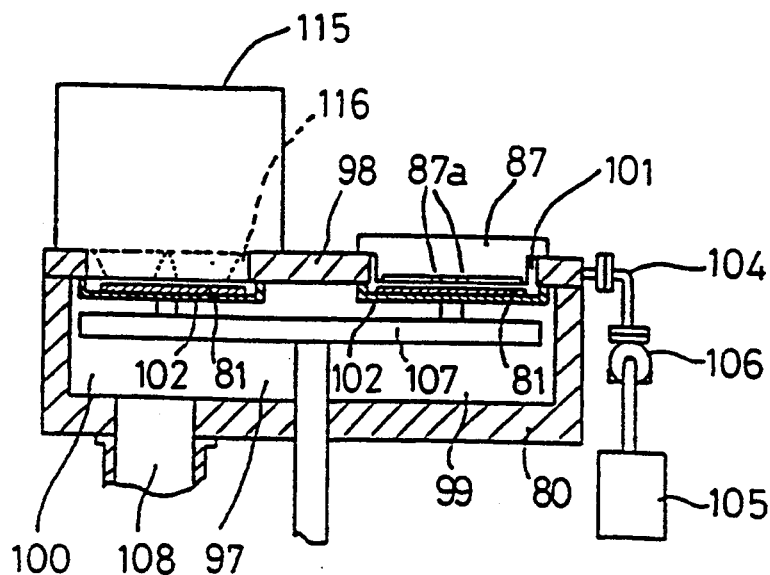
FIG. 10 is a cross-sectional view illustrating a conventional substrate loading apparatus.
Figure 11:
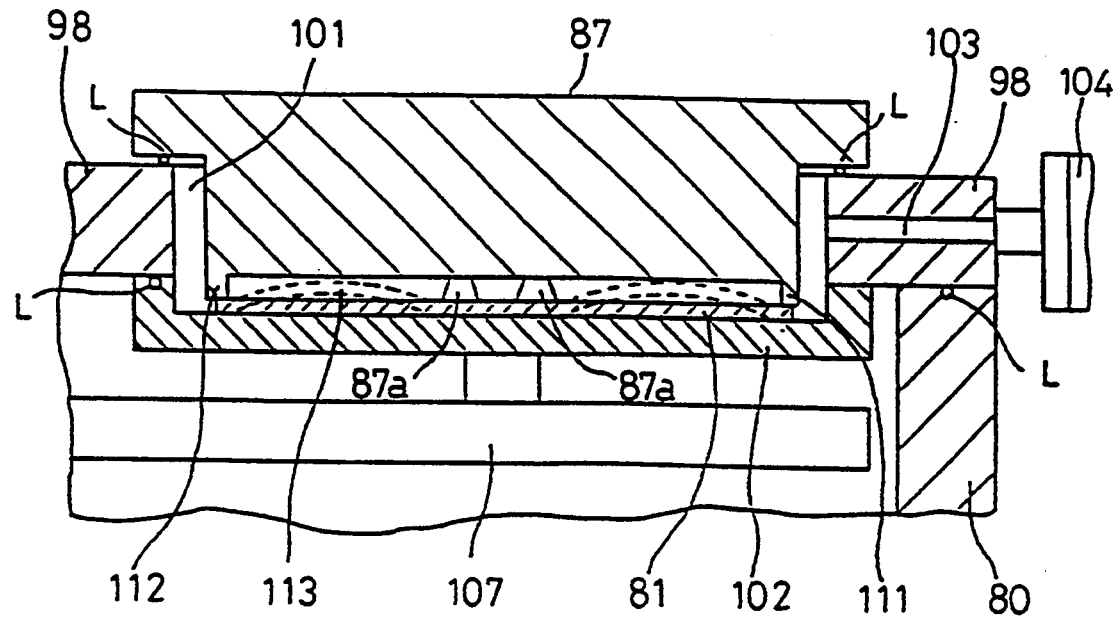
FIG. 11 is an enlarged diagram illustrating an essential portion of the apparatus shown in FIG. 10.
Figure 12:
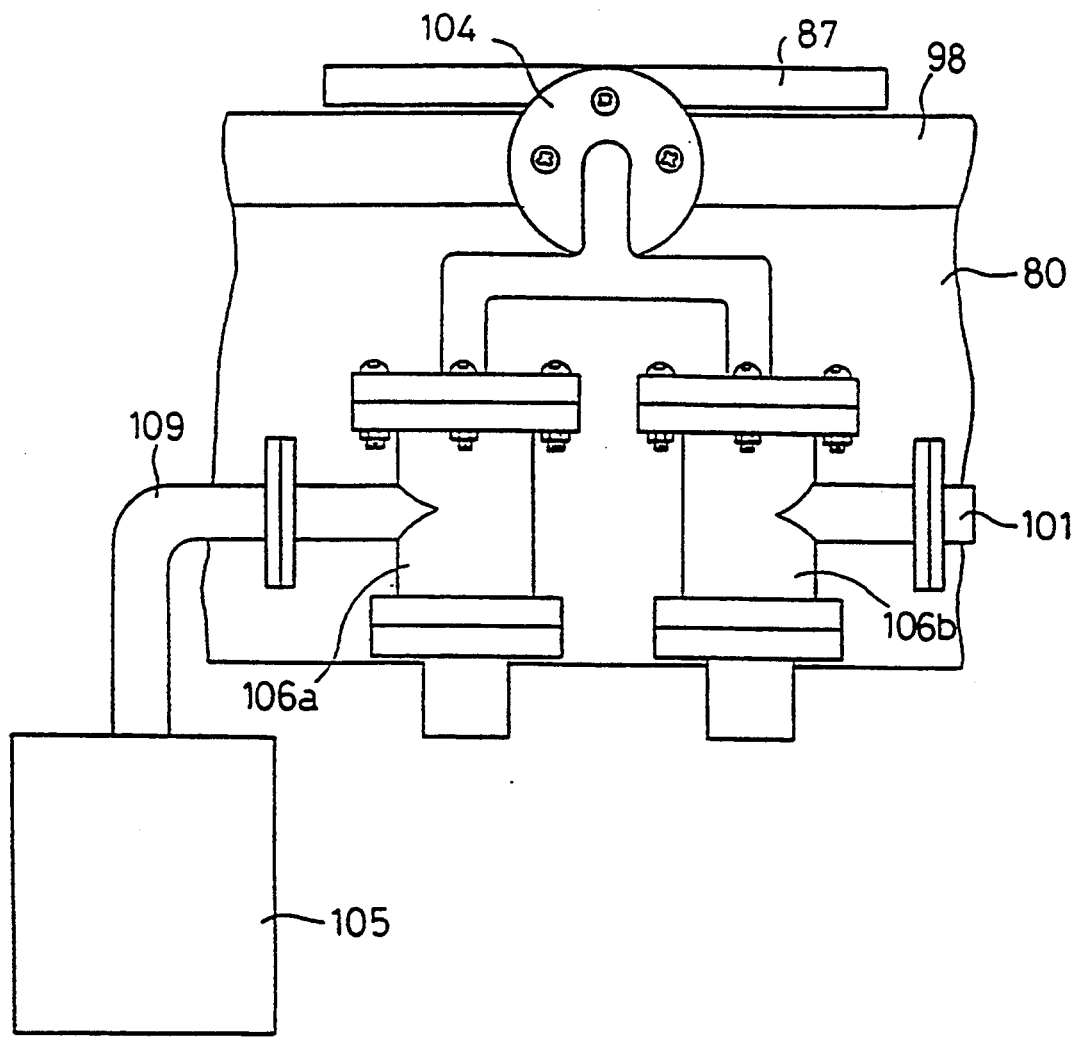
FIG. 12 is a right side view illustrating the apparatus shown in FIG. 10.

Next, a third embodiment of a loading apparatus according to the present invention will be described with reference to cross-sectional views of FIGS. 7 and 8 illustrating essential portions of the apparatus. Specifically, as shown in FIGS. 7 and 8, a common passage 60 and bifurcated passages 66a and 66b are formed in an upper wall plate 24. Further, bifurcated passages 66a and 66b have one end connected to common passage 60, and two other ends connected respectively to external pipes (later described in detail). The bifurcated passages 66a and 66b extend downward to valves 71a and 71b. In this embodiment, bifurcated passages 66a and 66b respectively serve as an exhaust pipe and an intake pipe with respect to load-lock chamber 23.

The wall of film-deposition chamber 20 extends in a block fashion to upper wall plate 24 so as to make close contact, and two concave-shaped manifolds 67a and 67b are formed in the thus extended wall of film-deposition chamber 20. Further, two ends of bifurcated passages 66a and 66b are exposed respectively to manifolds 67a and 67b through valve members 71a and 71b of a pair of valve mechanisms 70a and 70b.

As shown in FIG. 8, external pipes 68 and 69, which are respectively connected to an exhaust pump (not shown) and the atmosphere, are connected to manifolds 67a and 67b, respectively. The valve mechanisms 70a and 70b have cylinders 72b and 72b coupled respectively to valve members 71a and 71b. The valve mechanisms 70a and 70b serve to perform the open-and-close operations of the outlet ends of bifurcated passages 66a and 66b.

As described above, in the third embodiment, a wall surface 73 of upper wall plate 24, on which the outlet ends of bifurcated passages 66a and 66b are disposed, serves also as inner wall surface of manifolds 67a and 67b. Thus, the valve mechanism can be structured in a compact configuration. Further, reference characters L represent O-rings for sealing.

In the above-described embodiments, suction head 17 having both surfaces on which suction pads 18a and 18b are respectively provided is applied to the turn-over type substrate loading apparatus. However, the present invention is not limited to this but can also be applied to a pick-and place type substrate loading apparatus which employs a suction head having only one surface on which suction pads are provided.

Moreover, in the above-described embodiments, the loading apparatus according to the present invention has been applied to the sputtering system. However, the present invention is not limited to this but can also be applied to an etching system, a semiconductor wafer-processing system and the like as long as the applications are cases wherein a load-lock chamber is formed in the wall of an apparatus and the delivery and reception of an object are performed in the load-lock chamber. In such applications, the same advantages as those in the respective embodiments can also be obtained.

As described above, the load-lock type apparatus according to the present invention can efficiently transfer an object to be processed without damage. This can be achieved by the simple improvement of the suction head. Thus, the apparatus of this invention can be widely used in many applications other than the sputtering system, and has significant advantages in terms of practical applications.

Obviously, numerous additional modifications and variations of the present invention are possible in light of the above teachings. It is thereof to be understood that within the scope of the appended claims, the invention may be practiced otherwise than as specifically described herein.

What is claimed is:

1. A substrate loading apparatus for transferring into a load-lock chamber of a vacuum chamber a disk substrate, from a first position at which the disk substrate is delivered, to a second position situated in said load-lock chamber, comprising:

a shaft rotatable about an axis and having a circumference;

a suction head rotatable about said axis and having two surfaces opposing each other, each surface having a plurality of suction pads provided thereon, said axis extending in a direction parallel to said surfaces of said suction head;

a drive mechanism including: i) means for rotating said suction head such that each of said suction pad pluralities alternatively face said load-lock chamber at a position separated from said load-lock chamber and said first position, and ii) means for reciprocating said suction head to and from said load-lock chamber; and a pair of flexible pipes being circumferentially wound around said rotatable shaft in a helix, each pipe having one end connected to a separate plurality of said suction pads and the respective other end being connected to an exhaust pump.

2. The substrate loading apparatus of claim 1, wherein said surfaces of said suction head are adapted for receiving and delivering said disk substrate at said first and second positions and are separated by about 180 degrees.

3. The substrate loading apparatus of claim 1, wherein the suction pads on one of the surfaces of said suction head are adapted to hold a first substrate to be transferred into said vacuum chamber while the suction pads on the other surface of said suction head hold a second substrate to be transferred out.

4. The substrate loading apparatus of claim 1, wherein rotations of said suction head are half-turn reciprocating motions.

5. The substrate loading apparatus of claim 1, wherein said rotatable suction head may be subjected to shock when rotation is stopped, further including means for absorbing shock upon the stoppage of said suction head rotation.

6. The substrate loading apparatus of claim 1, further including means for rotating said suction head so as to turn over at said first position.

7. The substrate loading apparatus of claim 1, further including means for selectively operating said suction pads so as to suck and release said disk substrate.

8. The substrate loading apparatus of claim 1, further including means for reciprocating said suction head between said first and second positions to transfer said disk substrate therebetween.

9. The substrate loading apparatus of claim 8, further including means for rotating said suction head so as to turn over at said first position.

10. The substrate loading apparatus of claim 8, wherein said surfaces of said suction head are adapted to receive said disk substrate at said first position at which the disk substrate is delivered, and to deliver said disk substrate to said second position in said load-lock chamber, wherein said first and second positions are separated by about 180 degrees.

11. A substrate loading apparatus for loading a transferred substrate into a vacuum chamber while the substrate is being held by suction pads provided on a suction head, comprising:

said suction head having two surfaces opposing each other, each surface having a plurality of said suction pads provided thereon;

a drive mechanism including a rotating shaft mechanism having a circumference, means for giving said suction head repetitive vertical motions and means for giving said suction head repetitive rotational reciprocating motions at a position separated from said vacuum chamber;

a shock absorber for absorbing shock upon a stoppage of the repetitive vertical motions and rotational reciprocating motions of said suction head; and a pair of flexible pipes being circumferentially wound around said shaft, each pipe having one end connected to a separate plurality of said suction pads and the respective other end being connected to an exhaust pump.

12. The substrate loading apparatus of claim 11, wherein said means for rotational reciprocating motions includes a rack engaged with a pinion fixed to the rotating shaft of said drive mechanism which provides a linear reciprocating motion.

13. The substrate loading apparatus of claim 11, wherein said shaft includes openings and said pair of pipes are made of synthetic resin having colors different from each other, and wherein said one end of each pipe is connected to said openings in the shaft, said pipe being prevented from falling off by a stopper attached to the end of the shaft.

14. The substrate loading apparatus of claim 1, wherein each of the two opposing surfaces includes a periphery thinner than a center portion thereof; further including a transferring table provided in said vacuum chamber adapted for supporting a substrate, said table having a surface on which the substrate is placed, the surface having a periphery thinner than the center portion thereof and also having a plurality of convex portions formed in said periphery, for supporting the substrate.

15. The substrate loading apparatus of claim 14, wherein said convex portions formed in the periphery of the transferring table comprise an odd number of said convex portions.

16. The substrate loading apparatus of claim 11, further including means for selectively operating said suction pads so as to suck and release said disk substrate.

17. The substrate loading apparatus of claim 11, further including separate means for controlling capture and release of substrates, connected between the respective opposing pluralities of suction pads and said exhaust pumps.

18. A substrate loading apparatus for transferring into a load-lock chamber of a vacuum chamber a disk substrate, from a first position at which the disk substrate is delivered, to a second position situated in said load-lock chamber, comprising:

a shaft rotatable about an axis and having a circumference;

a suction head rotatable about said axis and having two surfaces opposing each other, each surface having a plurality of suction pads provided thereon, said axis extending in a direction parallel to said surfaces of said suction head;

a drive mechanism including: i) means for rotating said suction head such that each of said suction pad pluralities alternatively face said load-lock chamber at a position separated from said load-lock chamber and said first position, and ii) means for reciprocating said suction head to and from said load-lock chamber;

a pair of flexible pipes being circumferentially wound around said rotatable shaft in a helix, each pipe having one end connected to a separate plurality of said suction pads and the respective other end being connected to an exhaust pump; and separate means for controlling capture and release of substrates, connected between the respective opposing pluralities of suction pads and said exhaust pumps.

* * * * *